US012623533B1

(12) United States Patent
Sekiguchi et al.

(10) Patent No.: US 12,623,533 B1
(45) Date of Patent: May 12, 2026

(54) VEHICLE DRIVE DEVICE

(71) Applicant: TOYOTA JIDOSHA KABUSHIKI KAISHA, Toyota (JP)

(72) Inventors: Yoshito Sekiguchi, Kariya (JP); Tomoaki Furukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/259,416

(22) Filed: Jul. 3, 2025

(30) Foreign Application Priority Data

Nov. 14, 2024 (JP) ................................. 2024-199281

(51) Int. Cl.
| | |
|---|---|
| *B60K 17/22* | (2006.01) |
| *B60K 17/16* | (2006.01) |
| *F16H 57/04* | (2010.01) |

(52) U.S. Cl.
CPC .............. *B60K 17/22* (2013.01); *B60K 17/16* (2013.01); *F16H 57/043* (2013.01)

(58) Field of Classification Search
CPC ........ B60K 17/22; B60K 17/16; F16H 57/043
See application file for complete search history.

(56) References Cited

U.S. PATENT DOCUMENTS 11,400,803 B1 * 8/2022 Zhang ................. F16H 57/0472

FOREIGN PATENT DOCUMENTS

JP         4830709 B2 * 12/2011 ......... F16H 57/0427
JP    2024025399 A  *  2/2024

OTHER PUBLICATIONS

JP-2024025399-A Machine English Translation (Year: 2024).*
JP-4830709-B2 Machine English translation (Year: 2011).*

* cited by examiner

*Primary Examiner* — Jason D Shanske
*Assistant Examiner* — Matthew James O'Neill
(74) *Attorney, Agent, or Firm* — SoraIP, Inc.

(57) ABSTRACT

A vehicle drive device includes a traction motor having an output shaft that is hollow, a speed reducer coupled to the output shaft, a differential gear that distributes a drive force of the traction motor transmitted through the speed reducer to a pair of drive wheels, and a transmission shaft that extends through a through hole of the output shaft along an axial direction of the traction motor and is spline-fitted to a side gear of the differential gear by spline provided on an outer peripheral surface of a first end portion of the transmission shaft. The transmission shaft includes a first flow path that extends along the axial direction and a second flow path that has a first end that is open to the first flow path and the second end that is open to the outer peripheral surface of the transmission shaft.

3 Claims, 4 Drawing Sheets

LH ⟵⟶ RH

VEHICLE DRIVE DEVICE

CROSS-REFERENCE TO RELATED APPLICATION

This application claims priority to Japanese Patent Application No. 2024-199281 filed on Nov. 14, 2024. The disclosure of the above-identified application, including the specification, drawings, and claims, is incorporated by reference herein in its entirety.

BACKGROUND

1. Technical Field

The technique disclosed in the present specification relates to a vehicle drive device.

2. Description of Related Art

In Japanese Unexamined Patent Application Publication No. 2024-025399 (JP 2024-025399 A), a vehicle drive device in which a traction motor, a speed reducer, and a differential gear are disposed on the same axis is disclosed. In such a drive device, an output shaft of the traction motor is configured to be hollow, and a transmission shaft extends through a through hole of the output shaft along an axial direction of the traction motor. A first end portion of the transmission shaft is coupled to a differential gear, and a second end portion of the transmission shaft is coupled to a drive shaft.

SUMMARY

The transmission shaft is provided with a flow path through which a lubricant that lubricates a lubrication target portion, such as a speed reducer, flows. The flow path provided in the transmission shaft includes a flow path extending along an axial direction and a flow path extending in a radial direction from the flow path extending in the axial direction and opens to an outer peripheral surface. The lubricant flowing out of the flow path extending in the radial direction is supplied to the lubrication target portion.

There is concern that a strength of the transmission shaft may be decreased at a portion of the transmission shaft where the flow path extending in the radial direction opens to the outer peripheral surface. The present specification provides a technique for suppressing a decrease in strength of the transmission shaft in which a flow path through which a lubricant flows is provided.

A vehicle drive device according to the present specification may include a traction motor, a speed reducer, a differential gear, and a transmission shaft.

The traction motor includes an output shaft that is hollow. The speed reducer is coupled to the output shaft. The differential gear distributes a drive force of the traction motor transmitted through the speed reducer to a pair of drive wheels. The transmission shaft extends through a through hole of the output shaft along an axial direction of the traction motor, and is spline-fitted to a side gear of the differential gear by a spline provided on an outer peripheral surface of a first end portion of the transmission shaft. The transmission shaft may include a first flow path that extends along the axial direction and a second flow path that has a first end that is open to the first flow path and a second end that is open to the outer peripheral surface of the transmission shaft. The second end of the second flow path may be positioned on a tooth root portion of the spline.

As for a load is applied to a portion of the transmission shaft in which the spline is provided when the transmission shaft rotates, a large load is applied to the gear portion (that is, the protruding portion) of the spline, whereas a large load is not applied to the tooth root portion of the spline. In the vehicle drive device, the second flow path is open to the tooth root portion of the spline to which a large load is not applied. Therefore, the second flow path can be provided in the transmission shaft while the decrease in strength of the transmission shaft is being suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a drive device mounted in a vehicle will be described with reference to the drawings. Here, each direction in some drawings is substantially the same as the direction of the vehicle. The direction FR indicates a front in the front-rear direction of the vehicle, and the direction RR indicates a rear in the front-rear direction of the vehicle. In addition, the direction LH indicates the left side in the left-right direction of the vehicle, and the direction RH indicates the right side in the left-right direction of the vehicle. In addition, the direction UP indicates an upward direction in the up-down direction of the vehicle, and the direction DW indicates a downward direction in the up-down direction of the vehicle.

Figure 1:
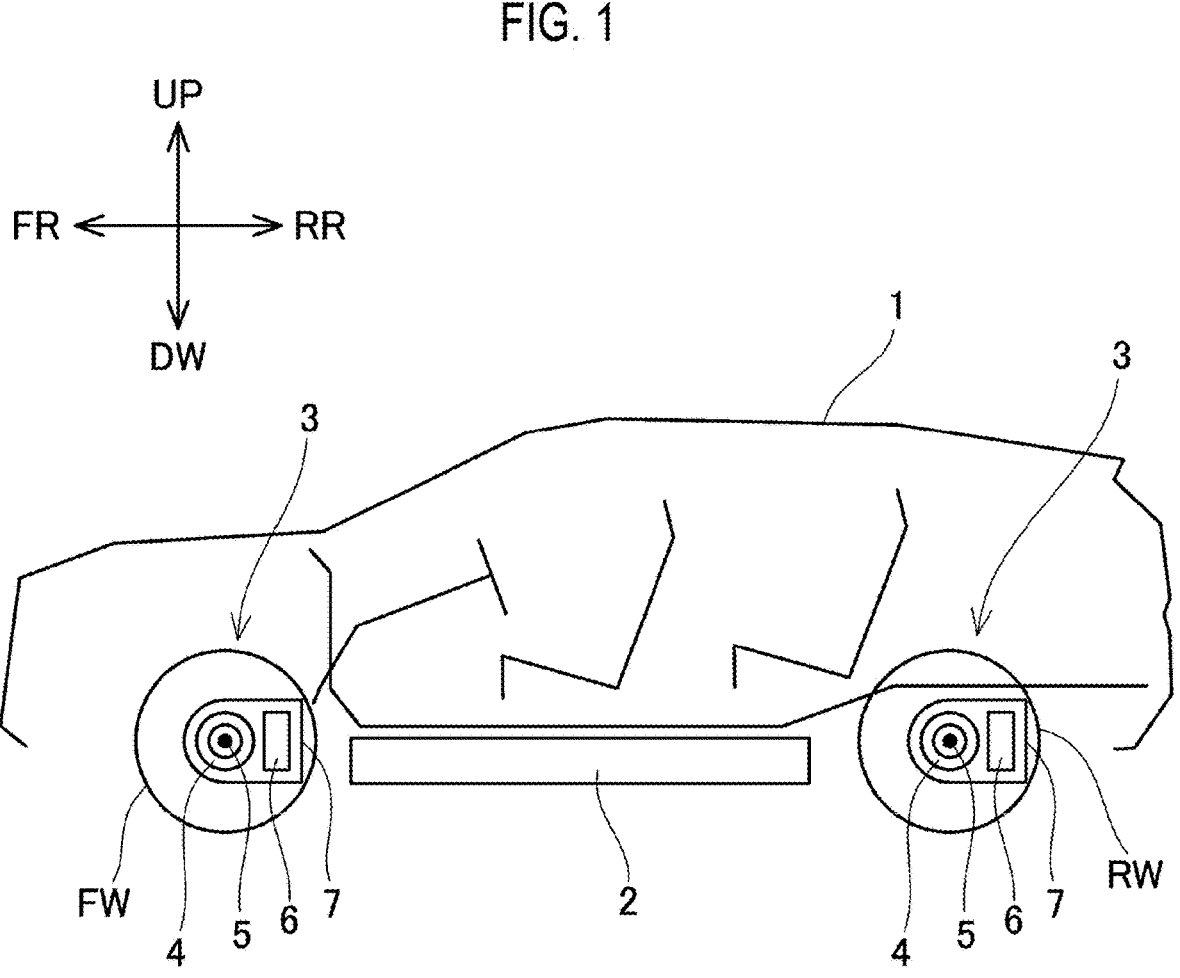
FIG. 1 is a diagram schematically showing a configuration of a vehicle.

FIG. 1 shows a configuration of a vehicle 1. The vehicle 1 is a vehicle having at least a traction motor as a drive source, and may be, for example, a battery electric vehicle, a hybrid electric vehicle, or a fuel vehicle.

The vehicle 1 includes a battery pack 2 mounted below a floor and a pair of drive devices 3. The battery pack 2 supplies electric power to each of the pair of drive devices 3. One drive device 3 of the pair of drive devices 3 drives the front wheels FW by using the supply electric power, and the other drive device 3 of the pair of drive devices 3 drives the rear wheels RW by using the supply electric power. Although the vehicle 1 is exemplified as a four-wheel drive vehicle, the vehicle 1 may be a two-wheel drive vehicle in which solely one of the pair of drive devices 3 is mounted. The pair of drive devices 3 has a common structure. Hereinafter, the pair of drive devices 3 will be described without distinction.

The drive device 3 includes a traction motor 4, a transmission device 5, a power control unit 6, and a casing 7. The traction motor 4, the transmission device 5, and the power control unit 6 are housed in the casing 7. The power control unit 6 is disposed at a position adjacent to the traction motor 4 and the transmission device 5 in a front-rear direction of the vehicle (in this example, a rear direction of the vehicle). The power control unit 6 converts the electric power supplied from the battery pack 2 from direct current to alternating current and supplies the electric power that is converted to the traction motor 4. The traction motor 4 generates a drive force based on the alternating current electric power supplied from the power control unit 6. The transmission device 5 amplifies the drive force generated by the traction motor 4 and then distributes the drive force that is amplified to the left and right wheels.

The traction motor 4 and the transmission device 5 are disposed on the same axis. Therefore, the size of the casing 7 that houses the traction motor 4 and the transmission device 5 in the up-down direction of the vehicle is reduced. As a result, the casing 7 is disposed to be within a range of the corresponding wheels FW, RW when viewed from the left-right direction of the vehicle. As a result, for example, on the front side of the vehicle 1, the freedom of disposition of various mechanical components, such as a radiator and an air conditioning control system, is improved, and it is possible to secure a large user space. In addition, at the rear side of the vehicle 1, for example, a trunk space can be secured largely, or a range of a reclining angle of a rear seat can be secured largely.

Figure 2:
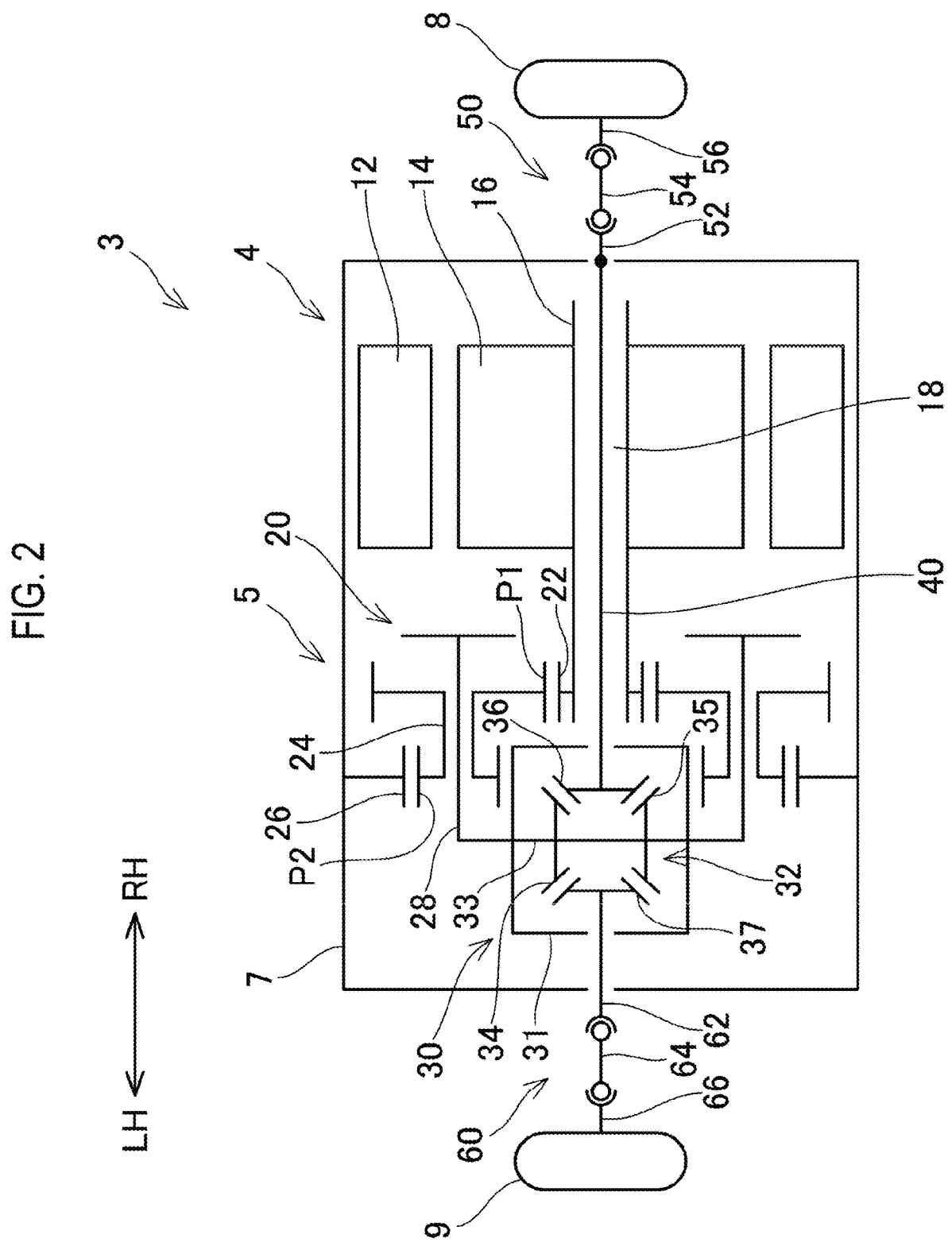
FIG. 2 is a diagram showing a skeleton diagram of a drive device mounted in the vehicle.

FIG. 2 is a skeleton view of the drive device 3 including the traction motor 4 and the transmission device 5 housed in the casing 7. In this example, the traction motor 4 is disposed on the right side in the casing 7, and the transmission device 5 is disposed on the left side in the casing 7. Instead of this example, the transmission device 5 may be disposed on the right side in the casing 7, and the traction motor 4 may be disposed on the left side in the casing 7. In the following, the name of the component has a left-right direction for the convenience of description, but such a designation does not limit the position of the component.

The traction motor 4 includes a stator core 12, a rotor 14, and an output shaft 16. The stator core 12 is fixed to the casing 7. The rotor 14 is supported by the casing 7 so as to be rotatable around a rotation shaft of the traction motor 4. The output shaft 16 is coupled to the rotor 14 and rotates integrally with the rotor 14. The output shaft 16 is hollow and has a through hole 18 that extends along the rotation shaft direction of the traction motor 4.

The transmission device 5 includes a speed reducer 20 and a differential gear 30. The speed reducer 20 reduces the rotation of the output shaft 16 of the traction motor 4. The differential gear 30 distributes the drive force of the traction motor 4 transmitted through the speed reducer 20 to the right wheel 8 and the left wheel 9 on the right and left. The traction motor 4, the speed reducer 20, and the differential gear 30 are disposed on the same axis. The configuration of the transmission device 5 to be described below is an example, and another type of configuration can be appropriately adopted.

The speed reducer 20 includes a sun gear 22, a plurality of stepped pinion gears 24, a ring gear 26, and a carrier 28. The sun gear 22 is coupled to the output shaft 16 of the traction motor 4 and rotates integrally with the output shaft 16. Each of the plurality of stepped pinion gears 24 includes a large-diameter pinion gear P1 and a small-diameter pinion gear P2 smaller in diameter than the large-diameter pinion gear P1. The large-diameter pinion gear P1 meshes with the sun gear 22. The small-diameter pinion gear P2 meshes with the ring gear 26. The ring gear 26 is fixed to the casing 7. The carrier 28 rotatably supports each of the plurality of stepped pinion gears 24. As described above, the speed reducer 20 includes the sun gear 22 as an input element, the ring gear 26 as a reaction force element, and the carrier 28 as an output element.

The differential gear 30 includes a differential casing 31 and a differential gear mechanism 32. The differential casing 31 is supported by the casing 7 so as to be rotatable around the rotation shaft of the traction motor 4. The differential casing 31 is coupled to the carrier 28 of the speed reducer 20 and rotates integrally with the carrier 28. The differential gear mechanism 32 is housed in the differential casing 31.

The differential gear mechanism 32 includes a pinion shaft 33, a pair of differential pinion gears 34, 35, a right side gear 36, and a left side gear 37.

The pinion shaft 33 is coupled to the differential casing 31 and rotates integrally with the differential casing 31. The pinion shaft 33 extends in a direction perpendicular to the rotation shaft direction of the traction motor 4 in the differential casing 31. Each of the pair of differential pinion gears 34, 35 is supported on the pinion shaft 33 so as to be rotatable around the axis of the pinion shaft 33. The right side gear 36 is a member that outputs the drive force to the right wheel 8, and meshes with each of the pair of differential pinion gears 34, 35. The left side gear 37 is a member that outputs the drive force to the left wheel 9, and meshes with each of the pair of differential pinion gears 34, 35.

The drive device 3 further includes a transmission shaft 40, a right drive shaft 50 coupled to the right wheel 8, and a left drive shaft 60 coupled to the left wheel 9.

The transmission shaft 40 extends along the rotation shaft direction of the traction motor 4 in the through hole 18 of the output shaft 16. A left end portion of the transmission shaft 40 is coupled to a right side gear 36 of the differential gear 30, and a right end portion of the transmission shaft 40 is coupled to the right drive shaft 50.

The right drive shaft 50 includes a drive shaft inboard 52, an intermediate drive shaft 54, and a drive shaft outboard 56. The drive shaft inboard 52 is a left end portion of both end portions of the right drive shaft 50 in the axial direction, the left end portion being on the side disposed in the casing 7, and refers to a portion from a constant velocity joint to the left end surface. The drive shaft outboard 56 is a right end portion of both end portions of the right drive shaft 50 in the axial direction, the right end portion being on a side coupled to the right wheel 8, and refers to a portion from the constant velocity joint to the right end surface. The drive shaft inboard 52 of the right drive shaft 50 is coupled to the right side gear 36 of the differential gear 30 via the transmission shaft 40. The drive force output from the right side gear 36 is transmitted to the right drive shaft 50 via the transmission shaft 40.

The left drive shaft 60 includes a drive shaft inboard 62, an intermediate drive shaft 64, and a drive shaft outboard 66. The drive shaft inboard 62 is a right end portion of both end portions of the left drive shaft 60 in the axial direction, the right end portion being on a side disposed into the casing 7, and refers to a portion from the constant velocity joint to a right end surface. The drive shaft outboard 66 is a left end portion of both end portions of the left drive shaft 60 in the axial direction, the left end portion being on a side coupled to the left wheel 9, and refers to a portion from the constant velocity joint to a left end surface. A drive shaft inboard 62 of the left drive shaft 60 is coupled to a left side gear 37 of the differential gear 30. The drive force output by the left side gear 37 is directly transmitted to the left drive shaft 60.

Figure 3:
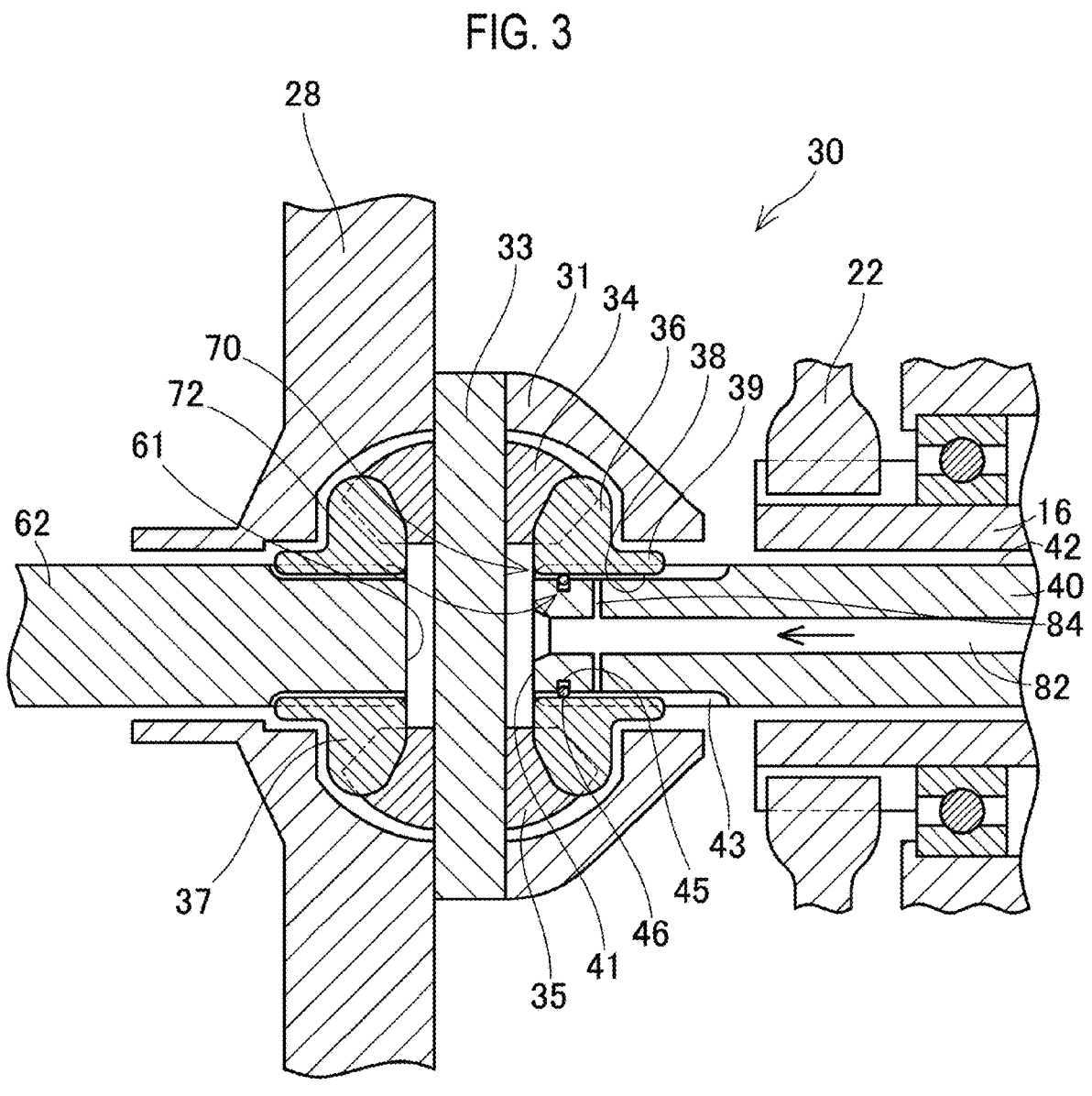
FIG. 3 is a diagram schematically showing a main part cross-sectional view of a vicinity of a spline fitting portion of a transmission shaft and a differential gear in an embodiment.

FIG. 3 is a cross-sectional view of the vicinity of a spline fitting portion 70 in which the transmission shaft 40 and the right side gear 36 of the differential gear 30 are spline-fitted. A left end portion of the transmission shaft 40 is spline-fitted to the right side gear 36. A left end portion of the transmission shaft 40 penetrates the right side gear 36, and a left end surface 41 of the transmission shaft 40 faces the pinion shaft 33. A drive shaft inboard 62 of the left drive shaft 60 is spline-fitted to the left side gear 37. The drive shaft inboard 62 penetrates the left side gear 37, and a right end surface 61 of the drive shaft inboard 62 faces the pinion shaft 33.

The left end portion of the transmission shaft 40 and the spline fitting portion 70 of the right side gear 36 will be described in detail. Outer spline teeth 43 are provided on an outer peripheral surface 42 of a left end portion of the transmission shaft 40. Inner spline teeth 39 are provided on an inner peripheral surface 38 of the right side gear 36. The transmission shaft 40 and the right side gear 36 are spline-fitted by the outer spline teeth 43 of the transmission shaft 40 and the inner spline teeth 39 of the right side gear 36. The spline fitting portion 70 is a portion configured by the outer spline teeth 43 of the transmission shaft 40 and the inner spline teeth 39 of the right side gear 36, and refers to a portion in which at least one of the outer spline teeth 43 and the inner spline teeth 39 is present.

In the drive device 3, a flow path through which the lubricant for lubricating and cooling the lubrication target portion, such as the traction motor 4 and the transmission device 5, flows is provided in the transmission shaft 40. The flow path provided in the transmission shaft 40 is configured to supply the lubricant to the lubrication target portion. The lubricant is sucked by a pump or the like from a storage portion provided at the bottom of the casing 7, is cooled by a heat exchanger or the like, and then is supplied to the flow path of the transmission shaft 40.

Hereinafter, a flow path, among the flow paths provided in the transmission shaft 40, that supplies the lubricant to the speed reducer 20 will be described in detail. As described above, a part of the speed reducer 20 is disposed between the traction motor 4 and the differential gear 30 in the axial direction of the traction motor 4. The flow path to be described below is a flow path that supplies the lubricant to a space between the traction motor 4 and the differential gear 30.

The transmission shaft 40 is provided with a first flow path 82 that extends along an axial direction of the transmission shaft 40. An arrow shown in the first flow path 82 indicates a direction in which the lubricant flows in the first flow path 82. The first flow path 82 is open to a left end surface 41 of the transmission shaft 40. As a result, a part of the lubricant flowing through the first flow path 82 is supplied to the internal space of the differential gear 30 to lubricate the gears 34, 35, 36, 37.

Further, a second flow path 84 extending along the radial direction of the transmission shaft 40 from the first flow path 82 is provided in the transmission shaft 40. The second flow path 84 has a first end that is open to the first flow path 82 and a second end that is open to the outer peripheral surface 42 of the transmission shaft 40. The second flow path 84 is open to the spline fitting portion 70 in the outer peripheral surface 42 of the transmission shaft 40.

Figure 4:
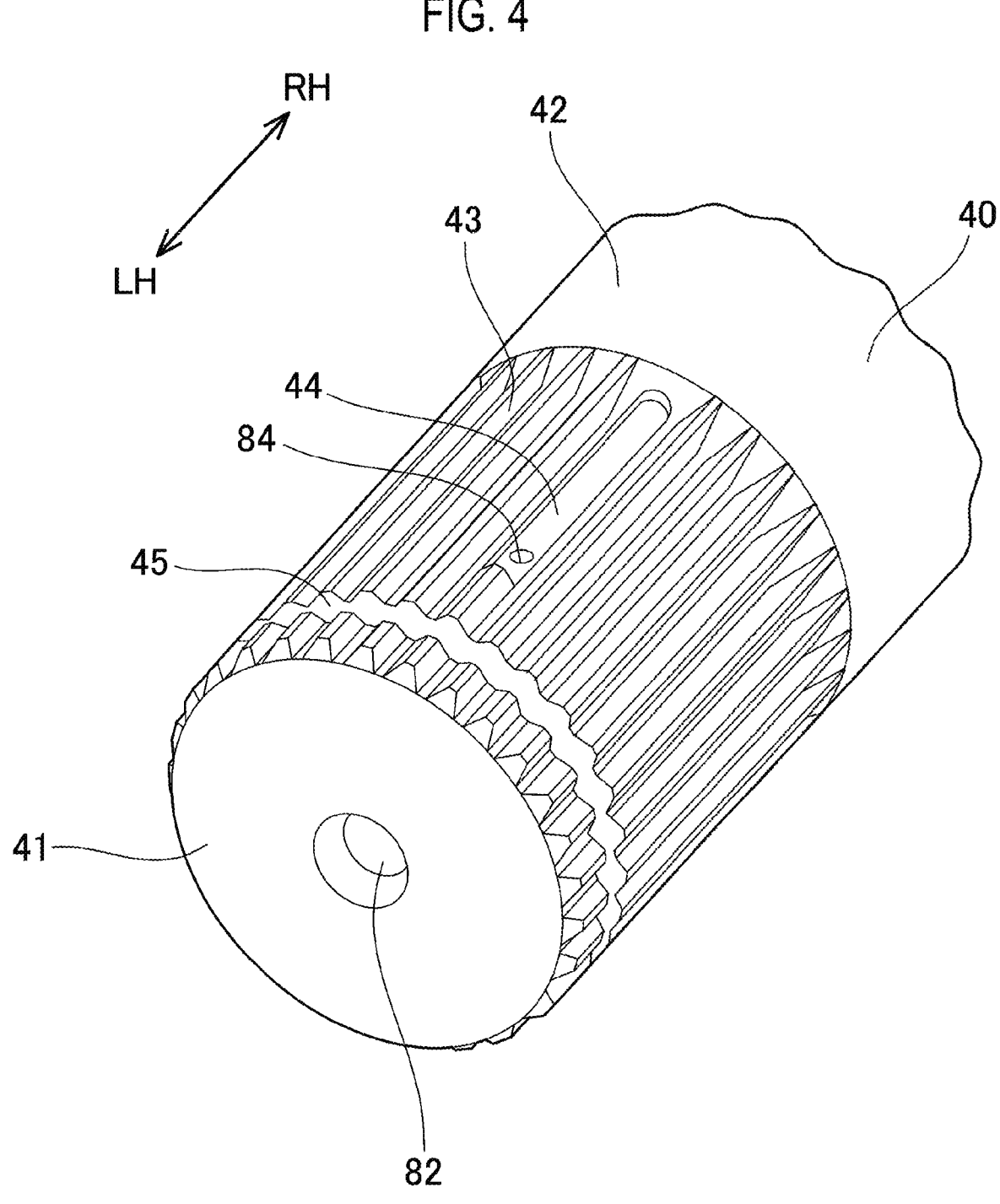
FIG. 4 is a diagram schematically showing a perspective view of an end portion of the transmission shaft coupled to the differential gear.

As shown in FIG. 4, a part of the outer spline teeth 43 provided on the outer peripheral surface 42 of the transmission shaft 40 has a missing tooth. As a result, an enlarged tooth root portion 44 in which the tooth root portions adjacent to each other are connected due to the missing tooth of the outer spline teeth 43 is provided on the outer peripheral surface 42 of the transmission shaft 40.

The enlarged tooth root portion 44 is provided in a part of the entire length of the spline fitting portion 70 in the axial direction. That is, the enlarged tooth root portion 44 does not extend from the first end edge to the second end edge of an axial direction of the spline fitting portion 70, that is, to the left end surface 41 of the transmission shaft 40. The second flow path 84 is open to an end portion on a side closer to the left end surface 41 of the enlarged tooth root portion 44. In other words, the enlarged tooth root portion 44 extends from the position where the second flow path 84 opens toward the end edge of the spline fitting portion 70 in the opposite direction to the left end surface 41. In this example, the enlarged tooth root portion 44 extends to the outside of the differential gear 30 of the differential casing 31 (see FIG. 3). The enlarged tooth root portion 44 of this example is provided by a part of one of the outer spline teeth 43 having a missing tooth. Instead of this example, the enlarged tooth root portion 44 may be formed by connecting three or more tooth root portions in which a part of each of a plurality of the outer spline teeth 43 has a missing tooth, the plurality of the outer spline teeth 43 being arranged in the peripheral direction of the transmission shaft 40.

The spline fitting portion 70 includes a flow path through which the lubricant flows along the axial direction of the transmission shaft 40. The flow path configured in the spline fitting portion 70 is referred to as a third flow path. The flow path is configured by a gap between the outer spline teeth 43 and the inner spline teeth 39 that configure the spline fitting portion 70. In particular, the spline fitting portion 70 is provided with the enlarged tooth root portion 44, and is also provided with a flow path having an enlarged cross-sectional area.

As shown in FIGS. 3 and 4, a sealing portion 72 is provided in the spline fitting portion 70. The sealing portion 72 includes a groove 45 that extends along the peripheral direction of the transmission shaft 40 and a sealing member 46 having an annular shape attached to the groove 45. The sealing portion 72 is disposed between the position where the second flow path 84 is provided in the spline fitting portion 70 and the left end surface 41. The sealing member 46 seals a gap between the outer spline teeth 43 and the inner spline teeth 39 to suppress the lubricant from flowing in the axial direction beyond the sealing member 46. The sealing member 46 is not particularly limited, and may be, for example, an O-ring made of a material such as a resin.

The lubricant flowing out from the second flow path 84 to the spline fitting portion 70 flows through a flow path configured in the spline fitting portion 70. Since the sealing portion 72 is provided in the spline fitting portion 70, the lubricant flowing out to the spline fitting portion 70 flows toward the side opposite to the left end surface 41 of the transmission shaft 40. In particular, since the flow path having the cross-sectional area enlarged by the enlarged tooth root portion 44 is present, the lubricant flowing out to the spline fitting portion 70 can smoothly flow out beyond the end edge of the spline fitting portion 70 to the outside of the differential casing 31 of the differential gear 30. As a result, the lubricant is supplied to a space between the traction motor 4 and the differential gear 30.

For example, in order to supply the lubricant to the space between the traction motor 4 and the differential gear 30, a radial flow path may be provided in a part of the transmission shaft 40 that is located directly below the space, that is, a part different from the part where the spline fitting portion 70 is provided. However, the maximum shear stress applied to the transmission shaft 40 when the transmission shaft 40 rotates is generated on the outer peripheral surface of the portion having the maximum diameter. In a case where the radial flow path is provided in such a portion, there is concern that the strength of the transmission shaft 40 may be decreased. On the other hand, in the above example, the second flow path 84 is provided in the spline fitting portion 70. As for the load applied to the spline fitting portion 70 when the transmission shaft 40 rotates, a large load is applied to the gear portion (that is, the protruding portion) of the outer spline teeth 43, and a large load is not applied to the tooth root portion of the outer spline teeth 43. In the above example, the second flow path 84 is open to the tooth root portion of the outer spline teeth 43 to which a large load is not applied. Therefore, even in a case where the second flow path 84 is provided in the transmission shaft 40, the decrease in the strength of the transmission shaft 40 can be suppressed. In addition, since the decrease in strength of the transmission shaft 40 can be suppressed, the diameter of the transmission shaft 40 can be reduced.

Hereinafter, the aspects disclosed in the present specification will be organized. Each of the technical elements described below is an independent element, and may exhibit technical advantages either individually or in combination with other elements.

Aspect 1

A vehicle drive device includes a traction motor including an output shaft that is hollow, a speed reducer coupled to the output shaft, a differential gear that distributes a drive force of the traction motor transmitted through the speed reducer to a pair of drive wheels, and a transmission shaft that extends through a through hole of the output shaft along an axial direction of the traction motor and is spline-fitted to a side gear of the differential gear by spline provided on an outer peripheral surface of a first end portion of the transmission shaft, in which the transmission shaft includes a first flow path extending along the axial direction and a second flow path having a first end that is open to the first flow path and a second end that is open to the outer peripheral surface of the transmission shaft, and the second end of the second flow path is positioned on a tooth root portion of the spline.

Aspect 2

The vehicle drive device according to Aspect 1, in which at least a part of the speed reducer is disposed between the traction motor and the differential gear in the axial direction, a spline fitting portion where the transmission shaft and the side gear are spline-fitted includes a third flow path, and the third flow path is at least a part of a flow path that allows the lubricant flowing out from the second end of the second flow path to flow to a side where at least a part of the speed reducer is present in the axial direction and that guides the lubricant to the outside of a casing of the differential gear.

Aspect 3

The vehicle drive device according to Aspect 2, in which the spline fitting portion includes a sealing portion that seals the third flow path, and the sealing portion is disposed on a side opposite to a side where at least a part of the speed reducer is present in the axial direction with respect to the position of the second end of the second flow path.

Aspect 4

The vehicle drive device according to any one of Aspects 1 to 3, in which the outer peripheral surface of the transmission shaft is provided with the spline, a part of the spline is a missing tooth, and the second end of the second flow path is positioned on an enlarged tooth root portion in which the tooth bottom portions adjacent to each other are connected to each other due to the missing tooth.

Aspect 5

The vehicle drive device according to Aspect 4, in which the enlarged tooth root portion is disposed on a side where at least a part of the speed reducer is present in the axial direction with respect to a position of the second end of the second flow path.

Although the embodiments have been described in detail above, the above is merely an example and does not limit the scope of claims. The techniques described in the claims include various modifications and changes of the specific examples exemplified above. The technical elements described in the present specification or the drawings exhibit technical usefulness alone or in various combinations, and are not limited to the combinations described in the claims at the time of filing. Further, the technology exemplified in the present specification or the drawings can achieve a plurality of objectives at the same time, and achieving one of the objectives has technical usefulness.

What is claimed is:

1. A vehicle drive device comprising:
   a traction motor including an output shaft that is hollow;
   a speed reducer coupled to the output shaft;
   a differential gear configured to distribute a drive force of the traction motor transmitted through the speed reducer to a pair of drive wheels; and
   a transmission shaft that extends through a through hole of the output shaft along an axial direction of the traction motor and that is spline-fitted to a side gear of the differential gear by a spline provided on an outer peripheral surface of a first end portion of the transmission shaft,
   wherein:
   the transmission shaft includes
      a first flow path extending along the axial direction, and
      a second flow path having a first end that is open to the first flow path and a second end that is open to the outer peripheral surface of the transmission shaft;
   the second end of the second flow path is positioned on a tooth root portion of the spline;
   at least a part of the speed reducer is disposed between the traction motor and the differential gear in the axial direction;
   a spline fitting portion where the transmission shaft and the side gear are spline-fitted includes a third flow path;
   the third flow path is at least a part of a flow path that allows a lubricant flowing out from the second end of the second flow path to flow to a side where the at least a part of the speed reducer is present in the axial direction and guides the lubricant to an outside of a casing of the differential gear;
   the spline fitting portion includes a sealing portion that seals the third flow path; and
   the sealing portion is disposed on a side opposite to the side where the at least a part of the speed reducer is present in the axial direction with respect to a position of the second end of the second flow path.

2. The vehicle drive device according to claim 1, wherein:
   a part of the spline provided on the outer peripheral surface of the transmission shaft has a missing tooth; and the second end of the second flow path is positioned on an enlarged tooth root portion in which tooth root portions adjacent to each other are connected due to the missing tooth.

3. The vehicle drive device according to claim 2, wherein the enlarged tooth root portion is disposed on a side where at least a part of the speed reducer is present in the axial direction with respect to a position of the second end of the second flow path.

\* \* \* \* \*